Patented Oct. 22, 1946

2,409,704

UNITED STATES PATENT OFFICE 2,409,704

PRODUCTION OF LAMINATING FABRICS

Arthur Lyem, Cumberland, Md., assignor to Celanese Corporation of America, a corporation of Delaware No Drawing. Application January 18, 1944, Serial No. 518,721

8 Claims. (Cl. 8—131)

This invention relates to the production of laminating fabrics, and relates more particularly to the preparation of a laminating fabric, comprising yarns having a basis of a thermoplastic material together with yarns having a basis of a non-thermoplastic material, for adhesively uniting fabrics to produce a composite or laminated fabric.

Methods heretofore employed in the preparation of plasticized laminating fabrics for use in the manufacture of laminated collars, cuffs, uniform and cap material and the like resulted in the laminating fabrics hving the property of self-adhesion, i. e. sticking together of layers of the laminating fabric when in the form of a roll. This property of self-adhesion is minimized by after-treatment with solvent for the plasticizer employed or with heat treatment provided that the plasticizer is of sufficient permanence. However, even with solvent and heat treatment, it is necessary, in order to prevent molding or fusing together of the layers of the roll of fabric, to re-roll the laminating fabrics during storage and even during the ageing operation. It is, accordingly, an important object of my invention to provide a novel process for the preparation of an improved plasticized laminating fabric, comprising yarns having a basis of a thermoplastic material together with yarns having a basis of non-thermoplastic material, which will be free from the property of self-adhesion.

Another object of my invention is the provision of a process for the preparation of plasticized laminating fabrics, comprising yarns having a basis of a thermoplastic material together with yarns having a basis of a non-thermoplastic material, which will materially shorten the usual ageing period.

Still another object of my invention is the provision of a process for the preparation of plasticized laminating fabrics, comprising yarns having a basis of a thermoplastic material together with yarns having a basis of a non-thermoplastic material, which obviates the necessity of treating plasticized and aged fabric with solvents or with heat.

Other objects of this invention will appear from the following detailed description.

I have discovered that by adding a small quantity of water to the plasticizer/alcohol mixture usually employed for preparing plasticized laminating fabric comprising yarns having a basis of a thermoplastic material together with yarns having a basis of a non-thermoplastic material, there is obtained a plasticized laminating fabric which is substantially free of self-adhesion.

In accordance with my invention, I prepare plasticized laminating fabric by incorporating in the plasticizer/alcohol mixture from 5 to 10%, preferably 5%, of water and applying the same to a fabric containing yarns having a basis of a thermoplastic material together with yarns having a basis of a non-thermoplastic material, in any suitable manner as by impregnation and squeezing the excess plasticizing mixture from said fabric. The treated material is then dried in any suitable manner at a temperature of from 135 to 145° C. and rolled up. The roll of treated material is aged from 1 to 3 days at a temperature of 40 to 55° C. and a relative humidity of from 40 to 50%. If desired, the aged laminating fabric may be given a treatment with an alcohol/water mixture containing from 10 to 30% of water by nipping followed by drying the fabric in a heating cabinet at 130° C., or by a relatively short dry heat treatment at a temperature of about 140 to 150° C. These latter treatments are not necessary for the production of plasticized material free from self-adhesion and may be eliminated. The fabric treated in accordance with my invention may be stored indefinitely in roll form without requiring re-rolling.

While the process of my invention will be more particularly described in connection with laminating fabrics in which the thermoplastic yarns employed have a basis of cellulose acetate, it is to be understood that my process may also be employed with fabrics containing other thermoplastic derivatives of cellulose. Examples of other organic derivatives of cellulose are cellulose esters, such as cellulose propionate and cellulose butyrate, mixed esters, such as cellulose acetopropionate and cellulose aceto-butyrate, and cellulose ethers such as ethyl cellulose and benzyl cellulose. Laminating fabrics containing other thermoplastic materials such as, for example, synthetic linear polyamide condensation products, e. g. polyhexamethylene adipamide, and vinyl resins may also be plasticized in like manner.

Any suitable plasticizer for the cellulose acetate component of the fabric may be employed in the plasticizer/alcohol mixture such as, for example, triethyl citrate, dimethoxy ethyl phthalate, dimethyl phthalate, diethyl phthalate, dibutyl phthalate, dibutyl tartrate, diphenyl phosphate and tricresyl phosphate. However, in the present process optimum results are obtained by the use of triethyl citrate and in an amount equal to 40% by weight of the plasticizing mixture. The alcohol preferably employed in accordance with this invention is ethyl alcohol containing 5% of water.

The fabric treated in accordance with my novel process of preparing laminating fabric is preferably a fabric containing filaments or fibers of cellulose acetate together with filaments or fibers of a non-thermoplastic material and more preferably a fabric containing from 25 to 35% of cellulose acetate filaments or fibers, from 50 to 65% of non-thermoplastic filaments or fibers. The fabric may be formed in any suitable manner, as by weaving, knitting netting or knotting yarns made of cellulose acetate filaments or fibers with yarns made of filaments or fibers of non-thermoplastic material. The fabric is advantageously formed in such a manner that the cellulose acetate yarns are dispersed uniformly throughout the fabric. The non-thermoplastic component of the fabric may be a textile material such as cotton, linen, regenerated cellulose and the like.

In order to illustrate further my invention but without being limited thereto the following example is given:

*Example*

A mixture comprising 40% by weight of triethyl citrate, 55% by weight of ethyl alcohol (ethyl alcohol 95% and water 5%), and 5% of water is applied to a fabric formed by weaving 33% of cellulose acetate yarns with 67% of cotton yarns by passing the fabric through a bath containing said mixture. The fabric is then nipped and dried in a continuous operation at 15 yards per minute speed and at a temperature of from 135 to 145° C. After this treatment, the fabric contains 34% by weight of triethyl citrate, 80% of which is contained by the cellulose acetate yarns. Upon the fabric being employed in the preparation of laminated fabrics, the laminating fabric yields a composite fabric requiring a force of three pounds to separate the respective layers when the composite fabric is cut into strips 1" wide.

The process of effecting the lamination of the laminating fabric with one or more layers of fabric may be any suitable method as, for instance, the wet method wherein the assembly of superimposed fabrics are wetted with water or steam and then subjected to heat and pressure, the dry method where the assembly of superimposed fabrics are subjected directly to heat and pressure in the absence of liquids, or the solvent method wherein the superimposed layers of fabric are wetted with a liquid or vapor which is solvent or swelling agent at elevated temperatures for the organic derivative of cellulose. Although any process of effecting the lamination may be employed I prefer to employ a two-step process in which the superimposed articles are first bound together by a dry method of laminating and then the adhesion between the layers is further increased by a wet method of laminating. For instance, the assembly of fabric bound by the dry method of laminating may be treated with water and then again subjected to heat and pressure.

Employing the process of my invention the necessity for ageing may be eliminated entirely since strongly adherent composite fabrics may be obtained directly after the plasticizing mixture is applied to the laminating fabric without any ageing whatever. Furthermore, the outer layers of composite fabrics made with laminating fabrics prepared in accordance with my invention do not become discolored due to the fact that there is substantially no superficially-held plasticizer on the laminating fabric and the plasticizer cannot sweat through the outer fabric layers and come to the surface after lamination.

It is to be understood that the foregoing detailed description is given merely by way of illustration and that many variations may be made therein without departing from the spirit of my invention.

Having described my invention, what I desire to secure by Letters Patent is:

1. Process for the preparation of a laminating fabric, which comprises applying to a fabric containing yarns having a basis of a thermoplastic organic derivative of cellulose and yarns having a basis of a non-thermoplastic material, a plasticizing mixture containing a plasticizer for said thermoplastic organic derivative of cellulose, alcohol and from 5 to 10% by weight of the plasticizing mixture of water.

2. Process for the preparation of a laminating fabric which comprises applying to a fabric containing yarns having a basis of cellulose acetate and yarns having a basis of a non-thermoplastic material, a plasticizing mixture containing a plasticizer for said cellulose acetate, alcohol and from 5 to 10% by weight of the plasticizing mixture of water.

3. Process for the preparation of a laminating fabric, which comprises applying to a fabric containing yarns having a basis of a thermoplastic derivative of cellulose material and yarns having a basis of a non-thermoplastic material, a plasticizing mixture containing a plasticizer for said thermoplastic material, alcohol and 5% by weight of the plasticizing mixture of water.

4. Process for the preparation of a laminating fabric, which comprises applying to a fabric containing yarns having a basis of cellulose acetate and yarns having a basis of a non-thermoplastic material, a plasticizing mixture containing a plasticizer for said cellulose acetate, alcohol and 5% by weight of the plasticizing mixture of water.

5. Process for the preparation of a laminating fabric, which comprises applying to a fabric containing yarns having a basis of a thermoplastic derivative of cellulose material and yarns having a basis of a non-thermoplastic material, a plasticizing mixture containing triethyl citrate, alcohol and 5% by weight of the plasticizing mixture of water.

6. Process for the preparation of a laminating fabric, which comprises applying to a fabric containing yarns having a basis of cellulose acetate and yarns having a basis of a non-thermoplastic material, a plasticizing mixture containing triethyl citrate, alcohol and 5% by weight of water.

7. Process for the preparation of a laminating fabric, which comprises applying to a fabric containing yarns having a basis of a thermoplastic derivative of cellulose material and yarns having a basis of a non-thermoplastic material, a plasticizing mixture containing 40% by weight of triethyl citrate, 55% by weight of a 95/5 ethyl alcohol/water mixture and 5% by weight of water.

8. Process for the preparation of a laminating fabric, which comprises applying to a fabric containing yarns having a basis of cellulose acetate and yarns having a basis of a non-thermoplastic material, a plasticizing mixture containing 40% by weight of triethyl citrate, 55% by weight of a 95/5 ethyl alcohol/water mixture and 5% by weight of water.

ARTHUR LYEM.